US012764701B2

(12) United States Patent
Baughman et al.

(10) Patent No.: US 12,764,701 B2
(45) Date of Patent: Oct. 13, 2026

(54) LOCAL PLANNING OPTIMIZATION USING MACHINE LEARNING AND SIGNAL STRENGTH

(71) Applicant: INTERNATIONAL BUSINESS MACHINES CORPORATION, Armonk, NY (US)

(72) Inventors: Aaron K. Baughman, Cary, NC (US); Eduardo Morales, Key Biscayne, FL (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/301,980

(22) Filed: Apr. 17, 2023

(65) Prior Publication Data

US 2024/0349226 A1 Oct. 17, 2024

(51) Int. Cl.

*H04W 64/00* (2009.01)
*H04B 17/318* (2015.01)
*H04L 41/16* (2022.01)

(52) U.S. Cl.

CPC .......... *H04W 64/00* (2013.01); *H04B 17/318* (2015.01); *H04L 41/16* (2013.01)

(58) Field of Classification Search

None

See application file for complete search history.

(56) References Cited

U.S. PATENT DOCUMENTS

| | | | |
|---|---|---|---|
| 8,355,818 | B2 | 1/2013 | Nielsen et al. |
| 10,217,120 | B1 | 2/2019 | Shin et al. |
| 10,749,995 | B2 | 8/2020 | Muscariello et al. |
| 10,764,188 | B2 | 9/2020 | Muscariello et al. |
| 10,798,633 | B2 | 10/2020 | Muscariello et al. |

(Continued)

FOREIGN PATENT DOCUMENTS

CN 102904829 A 1/2013

OTHER PUBLICATIONS

Berenson, D. et al., "An Optimization Approach to Planning for Mobile Manipulation," In 2008 IEEE International Conference on Robotics and Automation, May 19, 2008, pp. 1187-1192.

(Continued)

*Primary Examiner* — Suhail Khan

(74) *Attorney, Agent, or Firm* — CHIP LAW GROUP

(57) ABSTRACT

A computer-implemented process using a queue management system includes the following operations. A user and a plurality of configurable nodes are identified in a scope of the queue management system. A proximity between the user and a particular one of the plurality of configurable nodes is dynamically determined in real-time. Using a machine learning engine and based upon the proximity and historical data associated with the scope of the queue management system, a probability measure that the user will engage with the particular one of the plurality of configurable nodes is determined. Based upon the probability measure exceeding a threshold, the user is added to a queue managed by the queue management system. Based upon the user being added to the queue, a state of the one of the plurality of plurality of configuration nodes is altered by the queue management system.

20 Claims, 9 Drawing Sheets

Target Q value　　Predicted Q value $$L(\theta) = [((r + \gamma max_{at+1}\ Q(s_{t+1}, a_{t+1};\ \theta^{target})) - Q(s, a; \theta^{pred}))^2]$$

(56) References Cited

U.S. PATENT DOCUMENTS

| | | | | |
|---|---|---|---|---|
| 2014/0349684 | A1* | 11/2014 | Leppanen | H04L 67/10 455/456.3 |
| 2018/0288586 | A1 | 10/2018 | Tran et al. | |
| 2019/0012909 | A1 | 1/2019 | Mintz | |

OTHER PUBLICATIONS

Choudhary, S. et al., "Modeling and Optimization of Mobile Signal Strength in challenging Atmospheric Conditions." 2021, 27 pg.

Nakatani, T. et al., "Estimating the physical distance between two locations with wi-fi received signal strength information using obstacle-aware approach," Proceedings of the ACM on Interactive, Mobile, Wearable and Ubiquitous Technologies, Sep. 18, 2018, vol. 2, No. 3, pp. 1-26.

Oransirikul, T. et al., "Social distancing warning system at public transportation by analyzing wi-fi signal from mobile devices," In Adjunct Proceedings of the 2020 ACM International Joint Conference on Pervasive and Ubiquitous Computing and Proceedings of the 2020 ACM International Symposium on Wearable Computers, Sep. 10, 2020, pp. 267-271, (Abstract).

Liu, X. et al., "Path planning for mobile robotic arms incorporating adaptive gravitational fields," In 2021 International Conference on Robotics and Control Engineering, Apr. 22, 2021, pp. 13-18.

Takai, H. et al., "A design of onboard multi-channel sonar signal processing system for autonomous mobile robots," In 2009 ICCAS-SICE, Aug. 18, 2009, pp. 5740-5744, IEEE (Abstract).

Han, S. et al., "Smartphone Application to Estimate Distances from LTE Base Stations Based on Received Signal Strength Measurements," 2019 34th International Technical Conference on Circuits/Systems, Computers and Communications (ITC-CSCC), JeJu, Korea (South), 2019, pp. 1-3.

Haubner, T. et al., "Active acoustic source tracking exploiting particle filtering and monte carlo tree search," In 2019 27th European Signal Processing Conference (EUSIPCO), Sep. 2, 2019, pp. 1-5, IEEE.

Oleiwi, B.K. et al., "Application of fuzzy logic for collision avoidance of mobile robots in dynamic-indoor environments," In 2021 2nd International Conference on Robotics, Electrical and Signal Processing Techniques (ICREST), Jan. 5, 2021, pp. 131-136, IEEE.

"What is Monte Carlo Simulation?" [online] IBM Cloud Education, Oct. 24, 2020, retrieved from the Internet: <https://www.ibm.com/cloud/learn/monte-carlo-simulation>, 6 pg.

"SPSS Statistics," [online] IBM Corporation [retrieved Nov. 28, 2022], retrieved from the Internet: <https://www.ibm.com/products/spss-statistics>, 10 pg.

"System and Method for Enhancing Self Optimizing Functions of a Network," IP.com Prior Art Database, Technical Disclosure No. IPCOM000241147D, Mar. 31, 2015, 5 pg.

"System and Method for Augmented Reality Optimized Task Management," IP.com Prior Art Database, Technical Disclosure No. IPCOM000260176D, Oct. 28, 2019, 8 pg.

"Wireless Access Signal Optimization," IP.com Prior Art Database, Technical Disclosure No. IPCOM000268262D, Jan. 17, 2022, 4 pg.

"System and Method for Managing Given Constraint by Optimizing Inflow of Entities Within a Perimeter Area," IP.com Prior Art Database, Technical Disclosure No. IPCOM000270437D, Jul. 3, 2022, 5 pg.

Song, Q. et al., "Intelligent optimization algorithm-based path planning for a mobile robot," Computational Intelligence and Neuroscience, Sep. 29, 2021, 17 pg.

Park, C. et al., "Real-time optimization-based planning in dynamic environments using GPUs," In 2013 IEEE International Conference on Robotics and Automation, May 6, 2013, pp. 4090-4097, IEEE.

Yoon, H.J. et al., "Socially aware path planning for a flying robot in close proximity of humans," ACM Transactions on Cyber-Physical Systems. Sep. 4, 2019; vol. 3No. 4, pp. 1-24.

Mell, P. et al., The NIST Definition of Cloud Computing, National Institute of Standards and Technology, U.S. Dept. of Commerce, Special Publication 800-145, Sep. 2011, 7 pg.

* cited by examiner

| | |
|---|---|
| **def create_data_model():** | |
| | """Stores the data for the problem.""" |
| | data = {} |
| | # Locations in block units |
| | locations = \ |
| | [(4, 4), # depot |
| | (2, 0), (8, 0), # locations to visit |
| | (0,1), (1,1), |
| | (5, 2), (7,2), |
| | (3,3), (6,3), |
| | (5, 5), (8, 5), |
| | (1, 6), (2, 6), |
| | (3, 7), (6, 7), |
| | (0, 8), (7, 8), |
| | # Convert locations in meters using a city block dimension of 114m x 80m. |
| | data['locations'] = [(l[0] * 114, l[1] * 80) for l in locations] |
| | data['num_vehicles'] = 1 |
| | data['depot'] = 0 |
| | return data |

FIG. 5A

| | |
|---|---|
| **def_create_distance_callback (data, manager):** | |
| | """Creates callback to return distance between points.""" |
| | distances_ = {} |
| | index_manager_ = manager |
| | # precompute distance between location to have distance callback in O(1) |
| | for from_counter, from_node in enumerate(data['locations']): |
| | distances_[from_counter] = {} |
| | for to_counter, to_node in enumerate(data['locations']): |
| | if from_counter == to_counter: |
| | distances_[from_counter][to_counter] = ( |
| | else: |
| | distances_[from_counter][ti_counter] = { |
| | abs(from_node[0] - to_node[0]) + |
| | abs(from_node[1] - to_node[1])) |
| | |
| | def distance_callback(from_index, to_index): |
| | """Returns the manhattan distance between the two nodes.""" |
| | # Convert from routing variable index to distance matrix NodeIndex. |
| | from_node = index_manager_.IndexToNode(from_index) |
| | to_node = index_manager_.IndexToNode(to_index) |
| | return distances_[from_node][to_node] |
| | |
| | return distance_callback |

FIG. 5B

LOCAL PLANNING OPTIMIZATION USING MACHINE LEARNING AND SIGNAL STRENGTH

BACKGROUND

The present invention relates to queue management, and more specifically, to forecasting movement behavior using machine learning to enhance queue management.

Queue optimization (also referred to as queue management) is a process whose goal is to reduce the waiting time prior to a task. In many situations, prior to a device/object/equipment/system (hereinafter referred to as "device") performing the task, the device must be configured to perform the task. For example, if a user wishes to use an elevator in a building, the elevator must first be configured to be available to the user (i.e., be on the same floor as the user). As another example, if a user enters a bank and wishes to engage with a teller, the teller's computer system must first be configured to access the user's account. As another example, if a truck arrives at a distribution center carrying an unusual load requiring specialized unloading equipment, this specialized unloading equipment must be prepositioned in the docking bay prior to the truck being unloaded. In still another example, if a patient arrives at an emergency room having a particular condition, whatever equipment that is required to treat the condition must be prepositioned, prior to the patient being treated. In all of these instances, the performance of a task is delayed because a device needed to perform the task has not yet been properly configured.

SUMMARY

A computer-implemented process using a queue management system includes the following operations. A user and a plurality of configurable nodes are identified in a scope of the queue management system. A proximity between the user and a particular one of the plurality of configurable nodes is dynamically determined in real-time. Using a machine learning engine and based upon the proximity and historical data associated with the scope of the queue management system, a probability measure that the user will engage with the particular one of the plurality of configurable nodes is determined. Based upon the probability measure exceeding a threshold, the user is added to a queue managed by the queue management system. Based upon the user being added to the queue, a state of the one of the plurality of plurality of configuration nodes is altered by the queue management system.

In other aspects of the process, the proximity includes a scalar distance and a change of distance, and the scalar distance is a non-Euclidian distance. Also, the user is associated with a personal communication device and each of the plurality of configurable nodes are respectively associated with a unique communication node, and the proximity is determined using mobile signal strength. The configurable nodes can be transportation nodes, and the plurality of configurable nodes includes a plurality of different types of configurable nodes. The threshold can be dynamically adjusted using the machine learning engine. Also, the determining the probability measure includes determining a probability that the user will wait for a particular type of node of the configurable node and determining a probability that the user will travel a particular distance to the particular one of the plurality of configurable node.

A computer hardware system having a queue management system includes a hardware processor configured to perform the following operations. A user and a plurality of configurable nodes are identified in a scope of the queue management system. A proximity between the user and a particular one of the plurality of configurable nodes is dynamically determined in real-time. Using a machine learning engine and based upon the proximity and historical data associated with the scope of the queue management system, a probability measure that the user will engage with the particular one of the plurality of configurable nodes is determined. Based upon the probability measure exceeding a threshold, the user is added to a queue managed by the queue management system. Based upon the user being added to the queue, a state of the one of the plurality of plurality of configuration nodes is altered by the queue management system.

In other aspects of the hardware system, the proximity includes a scalar distance and a change of distance, and the scalar distance is a non-Euclidian distance. Also, the user is associated with a personal communication device and each of the plurality of configurable nodes are respectively associated with a unique communication node, and the proximity is determined using mobile signal strength. The configurable nodes can be transportation nodes, and the plurality of configurable nodes includes a plurality of different types of configurable nodes. The threshold can be dynamically adjusted using the machine learning engine. Also, the determining the probability measure includes determining a probability that the user will wait for a particular type of node of the configurable node and determining a probability that the user will travel a particular distance to the particular one of the plurality of configurable node.

A computer program product includes a computer readable storage medium having stored therein program code. The program code, which when executed by computer hardware system including a queue management system, causes the computer hardware system to perform the following. A user and a plurality of configurable nodes are identified in a scope of the queue management system. A proximity between the user and a particular one of the plurality of configurable nodes is dynamically determined in real-time. Using a machine learning engine and based upon the proximity and historical data associated with the scope of the queue management system, a probability measure that the user will engage with the particular one of the plurality of configurable nodes is determined. Based upon the probability measure exceeding a threshold, the user is added to a queue managed by the queue management system. Based upon the user being added to the queue, a state of the one of the plurality of plurality of configuration nodes is altered by the queue management system.

In other aspects of the computer program product, the proximity includes a scalar distance and a change of distance, and the scalar distance is a non-Euclidian distance. Also, the user is associated with a personal communication device and each of the plurality of configurable nodes are respectively associated with a unique communication node, and the proximity is determined using mobile signal strength. The configurable nodes can be transportation nodes, and the plurality of configurable nodes includes a plurality of different types of configurable nodes. The threshold can be dynamically adjusted using the machine learning engine. Also, the determining the probability measure includes determining a probability that the user will wait for a particular type of node of the configurable node and determining a probability that the user will travel a particular distance to the particular one of the plurality of configurable node.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIGS. 5A and 5B respectively illustrate pseudocode for implementing aspects of the method of FIGS. 4A and 4B according to at least one embodiment of the present invention

DETAILED DESCRIPTION

Figure 1:
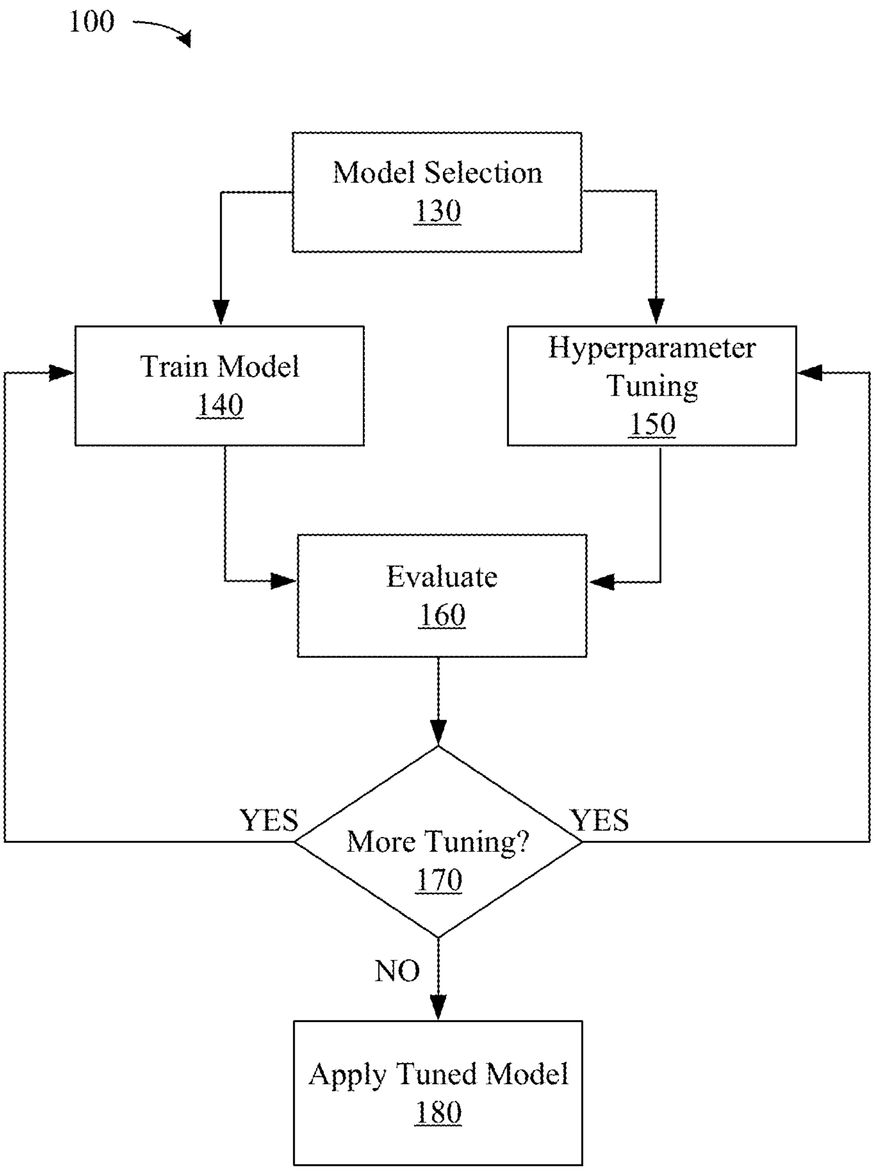
FIG. 1 is a flowchart of a typical reinforcement learning (RL) approach.

With reference to FIG. 1, a generic process 100 for machine learning is disclosed. In 130, the model to be trained is selected. There are a number of known models that can be used with machine learning. A non-exclusive list of these models includes linear regression, Deep Neural Networks (DNN), logistic regression, and decision trees. Depending upon the type of solution needed for a particular application, one or more models may be better suited.

In 140, the parameters of the model are tuned. There are many different types of known techniques used to train a model. Some of these techniques are discussed in further detail with regard to FIGS. 2A-2B. In 150, hyperparameters can be tuned. Hyperparameters are variables that govern the training process itself and differ from input data (i.e., the training data) and the parameters of the model. Examples of hyperparameters include, for example, the number of hidden layers in a DNN between the input layer and the output layer. Other examples include number of training steps, learning rate, and initialization values. In certain instances, the validation dataset can be used as part of this tuning process. Although illustrated as being separate from the tuning of the parameters of model in 150, the tuning of the hyperparameters can be performed in parallel with or in series with the tuning of the parameters of the model in 140.

In 160, the parameters of the model and the hyperparameters are evaluated. This typically involves using some metric or combination of metrics to generate an objective descriptor of the performance of the model. The evaluation typically uses data that has yet to be seen by the model (e.g., new interactions with the environment). The operations of 140-160 continue until a determination, in 170, that no additional tuning is to be performed. In 180, the tuned model can then be applied to real-world data.

Figure 2A:
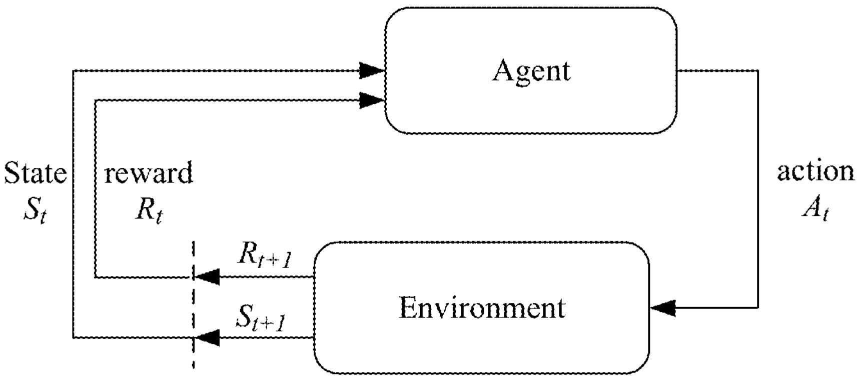
FIGS. 2A and 2B are block diagrams respectively schematically illustrating a reinforcement learning (RL) architecture and a deep Q-learning (DQN) architecture.
Figure 2B:
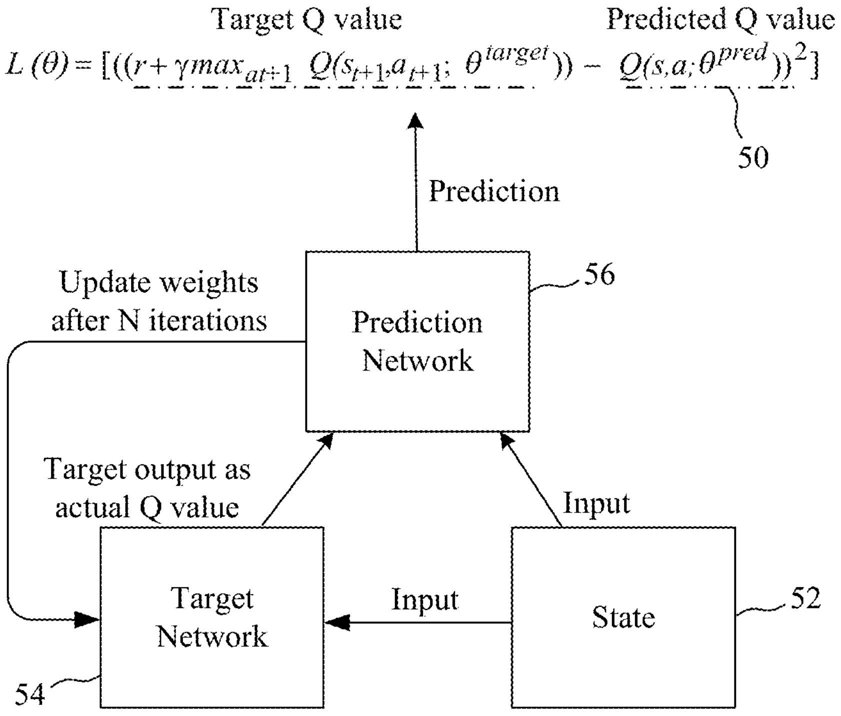

FIGS. 2A and 2B are block diagrams respectively illustrating a reinforcement learning (RL) architecture and a deep Q-learning (DQN) architecture for training a model. Machine learning paradigms include supervised learning (SL), unsupervised learning (UL), and reinforcement learning (RL). RL differs from SL by not requiring labeled input/output pairs and not requiring sub-optimal actions to be explicitly corrected. FIG. 2A schematically illustrates a generic RL approach. In describing RL, the following terms are oftentimes used. The "environment" refers to the world in which the agent operates. The "State" ($S_t$) refers to a current situation of the agent. Each State ($S_t$) may have one or more dimensions that describe the State. The "reward" ($R_t$) is feedback from the environment (also illustrated as "r" in FIG. 2B), which is used to evaluate actions ($A_t$) taken by the agent.

A reward function, which is part of the environment, generates the reward ($R_t$), and the reward function reflects the desired goal of the model being trained. The "policy" ($\pi$) is a methodology by which to map the State ($S_t$) of the agent to certain actions ($A_t$). Formally, the policy $\pi(s)$ is defined as the suggested action (or a probability distribution of actions) that the agent should take for every possible state $s \in S$. The "value" is a future reward received by an agent by taking an action ($A_t$) in a particular State ($S_t$). Ultimately, the goal of the agent is to generate actions ($A_t$) that maximize the reward function.

Examples of RL algorithms that may be used include Markov decision process (MDP), Monte Carlo methods, temporal difference learning, Q-learning, Deep Q Networks (DQN), State-Action-Reward-State-Action (SARSA), a distributed cluster-based multi-agent bidding solution (DCMAB), and the like. FIG. 2B illustrates one example of the operation of a DQN model. DQN is a combination of deep learning (i.e., neural network based) and reinforcement learning. Deep learning is another subfield of machine learning that involves artificial neural networks. An example of a computer system that employs deep learning is IBM's Watson. While the terms "neural network" and "deep learning" are oftentimes used interchangeably, by popular convention, deep learning (e.g., with a DNN), refers to a neural network with more than three layers inclusive of the inputs and the output. A neural network with just two or three layers is considered just a basic neural network.

A neural network can be seen as a universal functional approximator that can be used to replace the Q-table used in Q-learning. In a DQN model, the loss function 50 is represented as a squared error of the target Q value and prediction Q value. Error is minimized by optimizing the weights, $\theta$. In DQN, two separate networks (i.e., target network 54 and prediction network 56 having the same architecture) can be respectively employed to estimate target and prediction Q values based upon state 52. The result from the target model is treated as a ground truth for the prediction network 56. The weights for the prediction network 56 get updated every iteration and the weights of the target network 54 get updated with the prediction network 56 after N iterations.

Reference is made to FIGS. 3A-B and 4A-B, which respectively illustrate a queue management system 300 and methodology 400 forecasting movement behavior using machine learning and implementing statements based upon the same. The queue management system 300 and methodology 400 improves the process of identifying when a particular device should be configured based upon a user entering a queue. Although not limited in this manner, a queue management server 310 of the queue management system 300 can include a communication application programming interface (API) 312 configured to facilitate communications between the queue management server 310 with one or more communication nodes 325A-F associated with one or more configurable nodes 320A-D and 340. The queue management server 310 can also include a machine learning engine 314, data storage system 316, controller 318, and queue engine 319. Although illustrated as being separate components 312, 314, 316, 318, 319, one or more aspects of these components can be shared among the components 312, 314, 316, 318, 319.

Figure 4A:
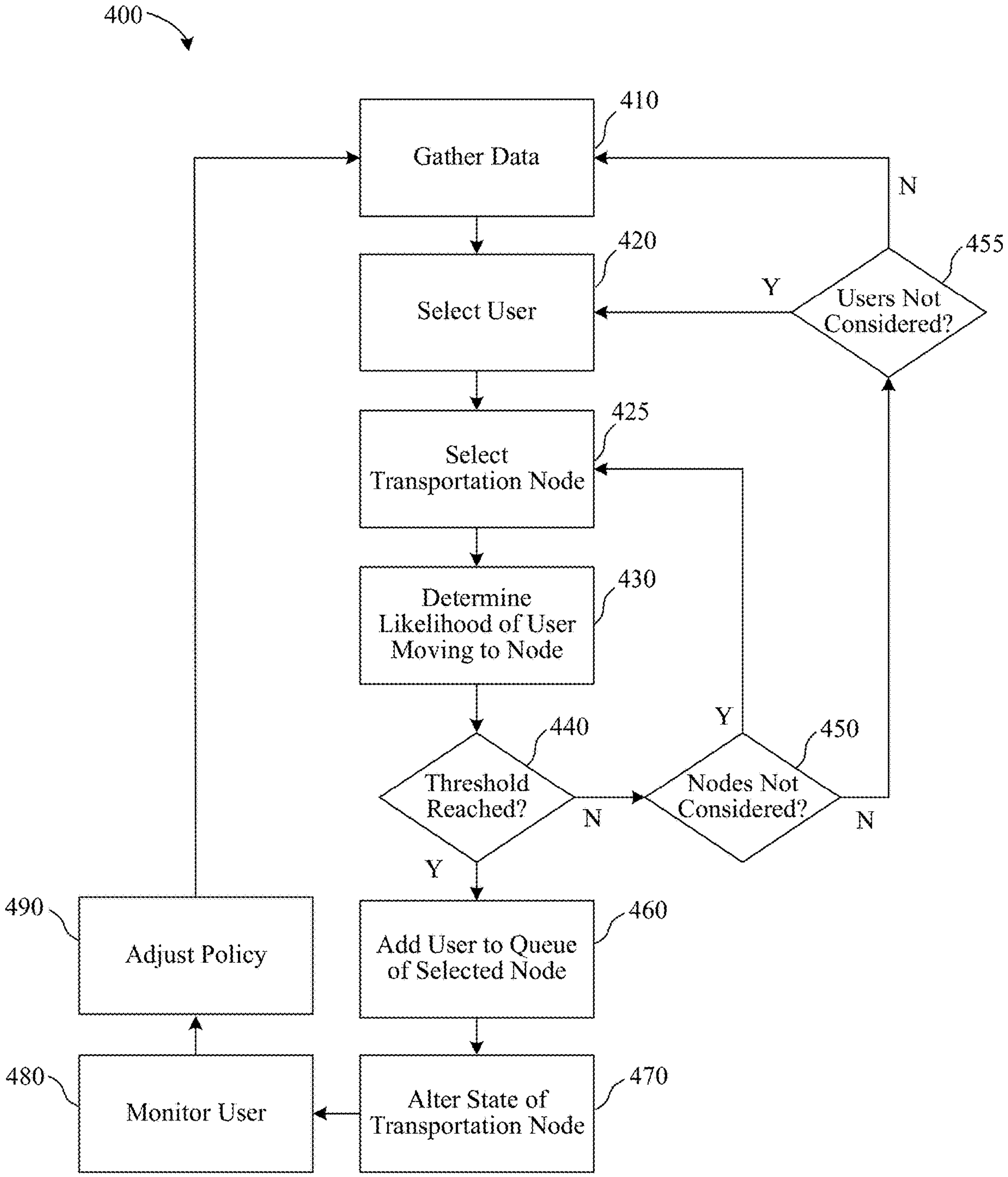
FIGS. 4A and 4B illustrates an example method using the architecture of FIG. 3A according to at least one embodiment of the present invention.
Figure 4B:
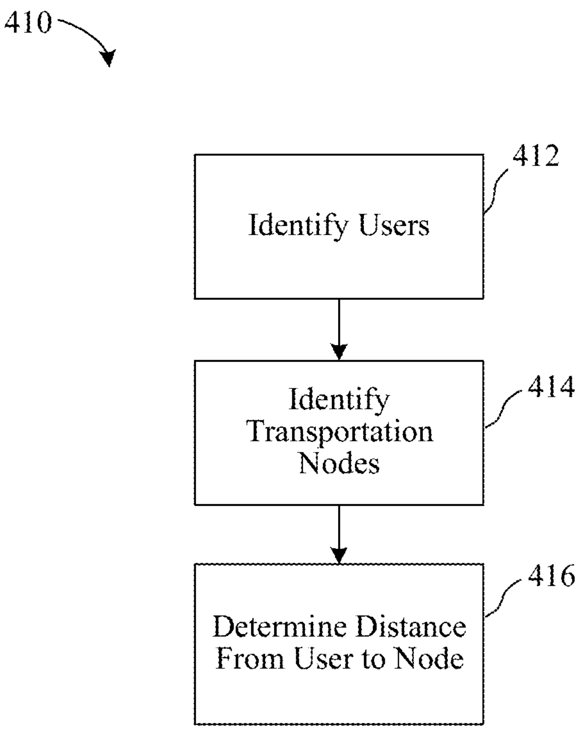

Referring to FIGS. 4A, 4B, a methodology 400 for forecasting movement behavior using machine learning and implementing state changes of configuration devices 320A-D and 340 is disclosed. In 410, data for use by the queue management system 300 is gathered. This data can include, the identity of the users 330A-B within the scope of the queue management system 300, the configurable nodes 320A-D. 340 within the scope of the queue management system 300, and distances between users 330A-B and the configurable nodes 320A-D, 340. As used herein, the "scope" of the queue management system 300 refers to a predefined space (physical and/or virtual) the queue management system 300 is responsible for managing.

Referring more specifically to FIG. 4B, in 412, the identity of the users 330A-B within the scope of the queue management system 300 are identified. There are many known approaches for identifying users 330A-D within a predefined space, and the present methodology 400 is not limited as to any particular approach so capable. For example, each of the users 330A-D may be associated with respective personal communication devices 325. The personal communication devices 325 can be for example, RFID cards, employee badges, communications devices (e.g., mobile phones), or the like, which can provide a unique identifier associated with the user 330A-D. Alternatively, if the specific identity of a user 330A-D is to be kept hidden from the queue management system 300, the queue management system 300 can provide each user 330A-D with a temporary identity for tracking the user through the scope of the queue management system 300. Other approaches to anonymizing the individual identities of the users are known and are capable of use with the queue management system 300.

In 414, the one or more configurable nodes 320A-D and 340 are identified. In the context of the present example, the one or more configurable nodes 320A-D and 340 are transportation nodes, such as banks of elevators 320A-D and stairs 340. In many instances, the number and identity of the one or more configurable nodes 320A-D and 340 are constant (i.e., unchanged) over time. Consequently, the identification of these configurable nodes 320A-D and 340 may only have to be done once or infrequently. Additionally, the configuration devices 310A and 340 are not limited as to a single particular type. For example, the architecture illustrated in FIG. 3 includes two types of configurable nodes: elevators 320A-D and stairs 340. This data can be stored, for example, in the data storage system 316 of the queue management system 310. Example pseudocode for identifying the nodes 320A-D and 340 is illustrated in FIG. 5A.

Figure 3A:
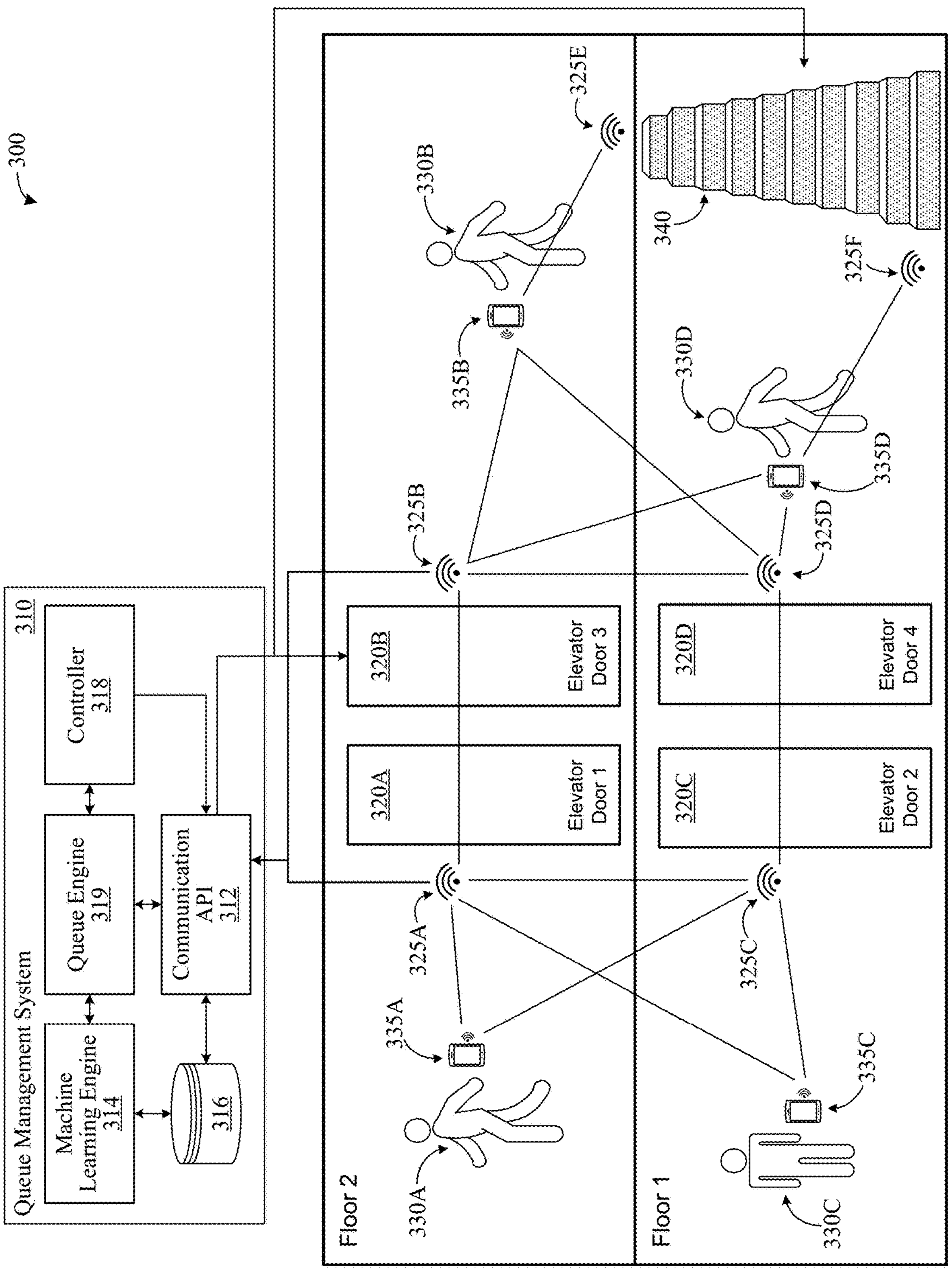
FIG. 3A is a block diagram illustrating an architecture of an example queue management system according to at least one embodiment of the present invention.
Figure 3B:
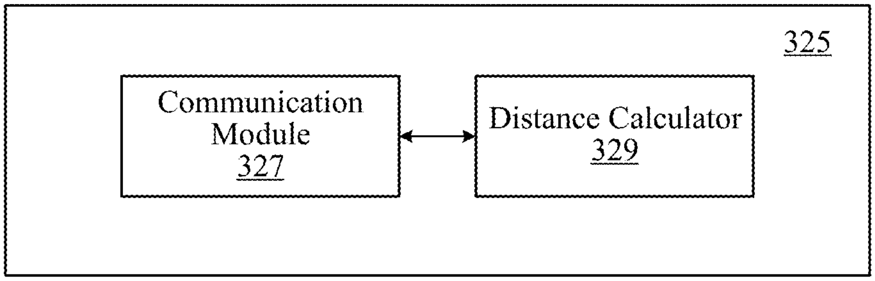
FIG. 3B is a block diagram illustrating an architecture of a communication node of FIG. 3A.

In 416, a proximity between the users 330A-D and the one or more configurable nodes 320A-D and 340 is determined using a distance calculator 329. Although FIG. 3B illustrates that the distance calculator is part of the communication node 325, the positioning of the distance calculator 329 is not limited in this manner. For example, one or more portions of the distance calculator 329 can reside with the queue management server 310 and/or the mobile devices 335A-D.

The proximity can be a scalar distance between a particular user 330A-D and a particular configurable node 320A-D and 34. Alternatively, the proximity can be a non-Euclidian distance such as a Manhattan distance. Additionally, the proximity can include whether the distance is changing (i.e., getting greater or getting smaller). Many different approaches for determining a proximity between the a particular user 330A-D and a particular one of the configurable nodes 320A-D and 340 are known, and the distance calculator 329 of the queue management system 300 is not limited as to a particular approach. However, in certain aspects, the queue management system 300 can use the signals emitted by the personal communication devices 335A-D respectively associated with the users 330A-D.

For example, mobile devices 335A-D oftentimes include transmitters that constantly produce signals using Bluetooth, WIFI, and/or LTE bands. The communication nodes 325A-D associated with one the or more configurable nodes 320A-D and 340 can include a communication module 327 and to detect these signals. WIFI and Bluetooth-emitted signal strengths can be typically measured using decibel milliwatts (dBm), a unit used to indicate the power ratio of decibels (dB) with reference to one milliwatt (mW) using the Received Signal Strength Indicator (RSSI). Employing this technique, a distance calculator 329 of the communication nodes 325A-D can deduce a distance between a particular communication node 325A-D and a particular mobile device 335A-D. By locating the communication nodes 325A-D adjacent the one or more configurable nodes 320A-D and 340 (e.g., at an elevator door or the entrance to stairs), the distance between the particular communication node 325A-D and the particular mobile device 335A-D can be used as a proxy for the distance between the user 330A-D (associated with the particular mobile device 330A-B) and the configurable node 320A-D and 340 (associated with the particular communication node 320A-D and 340).

In addition to the determining the distance between the users 330A-D to the one or more configurable nodes 320A-D and 340, the distance calculator 329 can also determine whether or not the distance is increasing or decreasing. Many different approaches are known for determining whether or not the distance between the users 330A-D and one or more configurable nodes 320A-D and 340 is increasing or decreasing, and the queue management system 300 is not limited as to a particular approach.

Although not limited in this manner, pseudocode for implementing a determination of the distance between two nodes is illustrated in FIG. 5B. Depending upon the circumstances, the distance could be a non-Euclidian distance (e.g., a Manhattan distance) between the two nodes or an Euclidian distance between the two nodes.

In 420, upon the data being gathered in 410, the queue management server 310 selects one of the users 330A-D to evaluate. The queue management server 310 is not limited in the manner in which the user 330A-D is selected. However, in certain aspects, the queue management server 310 selects, after ordering the users 330A-D from nearest to farthest away from one of the configurable nodes 320A-D and 340, the user 330A-D nearest to one of the configurable nodes 320A-D and 340. As further discussed with regard to 455, all users 330A-D can potentially be evaluated in turn.

In 425, upon a particular user 330A-D being selected in 420, the queue management server 310 selects a particular one of the configurable nodes 320A-D and 340 against which to evaluate the particular user 330A-D. As discussed above, in the context of the present example, the one or more configurable nodes 320A-D and 340 are transportation nodes, such as banks of elevators 310A-D and stairs 340. The queue management server 310 is not limited in the manner in which the particular one of the configurable nodes 320A-D and 340 is selected. However, in certain aspects, the queue management server 310 selects, after ordering the configurable nodes 320A-D and 340 from nearest to farthest away to the particular user 330A-D, the particular configurable node 310A and 340 nearest to one of the particular user 330A-D. As further discussed with regard to 450, all users 330A-D can potentially be evaluated in turn.

In 430, using, for example, the machine learning engine 314, a determination is made of a probabilistic measure that the particular user 330A-D will travel engage with a particular configurable node 320A-D. Although not limited in this manner, in certain aspects, the determining is based upon the proximity and historical data. For example, the process 400 can employ the following equation where:

$$P(\text{OptimalPath}|\text{Local Distance Behaviors})=(P(\text{Local Distance Behaviors}|\text{OptimalPath})P(\text{OptimalPath}))/(P(\text{Local Distance Behaviors})).$$

Employing the pseudocode illustrated in FIGS. 5A and 5B, a framework of path planning can be used in which a plurality of the configurable nodes 320A-D and 340 node can each be evaluated as a microsite that can be optimized around a local queue time. A generic path finding algorithm can find a minimum distance from the particular user 330A-D to the evaluated nodes 320A-D and 340. The present methodology 400, however, uses distance measures to each node 320A-D and 340 to dynamically update the values of the edge nodes. Each mode of transportation within a node (e.g., an elevator) is estimated as the effort to travel versus the distance to another node (e.g., stairs) measured by RSSI deduction.

A Residual Neural Network (RNN) accepts as input the RSSI signature of a traveler given modes of transportation wait time. The output is the probability of casing. The local node accumulation of casing $$\text{easement}(\overline{x}) = \frac{1}{N}\sum_{i=0}^{N} 1 - RNN(\overline{x}) \qquad \text{EQUATION 1}$$

The "casement" is an example of a probabilistic measure that the user will engage with a particular one of the configuration nodes 320A-D and 340.

Historical behavioral data regarding the current user or other others similar to the current user can be employed. For example, depending upon the time of day, a user may be more likely to use one of the configurable nodes 320A-D and 340. Additionally, the historical data can include the probability that a particular user will wait for a certain type of the configurable nodes 320A-D and 340. Other historical information can include a probability that the user will move a certain distance for the acceptance of a particular configurable node 320A-D and 340.

$$\text{patience}_{time}(k_t, \lambda_t) = \frac{\lambda_t^{k_t} e^{-\lambda_t}}{k_t!} \qquad \text{EQUATION 2}$$

$$\text{patience}_{distance}(k_d, \lambda_d) = \frac{\lambda_d^{k_d} e_d^{-\lambda_d}}{k_d!} \qquad \text{EQUATION 3}$$

Although not limited in this manner, but for worst case scenario planning, the above equations can be evaluated to take the minimum as follows:

$$\text{patience}_{total}(k_d, \lambda_d, k_t, \lambda_t) = \min(\text{patience}_{time}(k_t, \lambda_t), \text{patience}_{distance}(k_d, \lambda_d)) \qquad \text{EQUATION 4}$$

This impatience value can then be used scale the easement score as follows:

$$\text{easement}_{total}(\overline{x}, k_d, \lambda_d, k_t, \lambda_t) = 1 + \text{easement}(\overline{x}) + \text{patience}_{total}(k_d, \lambda_d, k_t, \lambda_t) \qquad \text{EQUATION 5}$$

Forecasting components can then be added based upon knowledge of the trends of the patience and easement components. For example, an autoregressive integrated moving average (ARIMA) model can be used to forecast user behaviors or the easement, time patience and distance patience.

$$\text{For } ARIMA(0, 0, q),\ y_t = e_t + \sum_{i=1}^{q} \theta_i e_{t-1} \qquad \text{EQUATION 6}$$

$$v_{T+h|T} = \hat{\sigma}^2\left[1 + \sum_{i=1}^{h-1} \theta_i e_{t-1}\right], \text{ for } h = 2, 3, \qquad \text{EQUATION 7}$$

The first ARIMA equation is p which is the number of time lags, d is the degree of difference, and q is the order of the moving average model. This provides a composite easement:

$$\text{easement}_{composite}(\overline{x}, k_d, \lambda_d, k_t, \lambda_t, p, d, q) = \frac{1}{2}\text{easement}_{total}(\overline{x}, k_d, \lambda_d, k_t, \lambda_t) + ARIMA(p, d, q) \qquad \text{EQUATION 8}$$

The composite easement scales each of the edge values between the global path planning.

In 440, the queue engine 319 makes a determination whether the threshold for adding a user 330A-D to the queue for the particular one of the configuration devices 320A-D and 340 has been met. Although not limited in this manner, the threshold could be a predetermined value. Alternatively, the threshold could be dynamically updated by the machine learning engine 314 using reinforcement learning.

If the threshold has been met for adding the user 330A-D to the queue, the process 400 proceeds to operation 460. If not, the process 400 proceeds to operation 450. In 450, a determination is made that for the particular user whether additional transportation nodes (i.e., configurable nodes 320A-D and 340) are to be evaluated. If so, the process proceeds to operation 425 to select another transportation node 320A-D and 340. Otherwise, the process 400 proceeds to operation 455. In 455, a determination is made as to whether additional identified users 330A-D are to be evaluated. If so, the process proceeds to operation 420 to select another identified user 330A-D. Otherwise, the process 400 returns to operation 410. In this manner, the process 400 continually evaluates new and old users as well as new and old distances between the users and the configurable nodes 320A-D and 340.

In 460, the user 330A-D is added to the queue for the particular one of the configuration devices 320A-D and 340. In 470, upon the user 330A-D being added to the queue for the particular one of the configuration devices 320A-D and 340, the particular one of the configuration devices 310 is configured to perform a task associated with the user 330A-D by altering a state of the particular one of the configurable nodes (i.e., transportation node) 320A-D and 340.

The manner by which the state of the particular one of the configurable nodes 320A-D and 340 can be determined by a state policy associated with a particular type of the particular one of the configurable nodes 320A-D. As used herein, a "state policy" refers to a policy that describes one or more actions that cause the state of a particular configurable node 320A-D and 340 to be altered based upon a user being added to the queue of the particular configurable node 320A-D and 340. This state policy can be stored, for example, within the data storage system 316 and implemented by the controller 318.

If, for example, the particular type of the particular one of the configurable nodes 320A-D is an elevator and based upon the state policy, the controller 318 can direct, via the communication API 312 of the queue management server 310, the elevator to position itself at the floor of the user 330A-B (or in close proximity to the floor). Alternatively, if the user 330A-D intends to use the stairs 340 and if the building associated with the scope of the queue management system 300 employs a system for reducing energy usage (e.g., by modifying climate control to unused portions of the building and/or turning off lights in unused locations), a state policy associated with the stairs 340 could be used to direct lighting (not illustrated) associated with the stairs 340 to be turned on. As can be readily envisaged, the state policy (and the manner by which states can be altered) can vary greatly depending upon the type of the configurable node 320A-D and 340 being altered.

In 480, after the state of the particular one of the configurable nodes 320A-D and 340 has been altered, the location of the user 320A-D can continue to be monitored. The actions performed by the user 320A-D can also be monitored. These actions can include, for example, whether the user actually used a particular configurable node 320A-D and 340. In 490, the prediction policy generated by the machine learning engine 314 can be modified consistent with a reinforcement learning process such as that described with reference to FIGS. 2A-B. Although illustrated as being performed after 470, operations 470 and 480 can be performed at any time during the process 400. The process 400 repeats itself by returning to 410.

Although the present inventive concepts were discussed in relation to the configurable nodes being transportation nodes, the disclosed framework is not limited in this manner. alternative approaches include the following.

With supply chain logistic, the disclosed framework could be used to provide a predictive pinch point solution can be delivered prior to issues being known or reported.

In water forecasting management, the disclosed framework could be used to provide demand forecasting, maintenance planning, and failure analysis.

In water forecasting management, the disclosed framework could be used to provide demand forecasting, maintenance planning, and failure analysis.

In cloud system management, the disclosed framework could be used to optimize server farms and data processing centers.

In business process management (BPM), the disclosed framework could be used to provide staffing and real-time scheduling within multi-process environments and well as simulate methods with the BPM space.

In call centers and IT management, the disclosed framework could be used to provide load forecasting for staffing, cost analysis, evaluation of service level agreements, identification of operational regimes, and identification of customer impatience, maintenance planning, and failure analysis.

In healthcare, the disclosed framework could be used to provide queueing models in medical-based operational management, load forecasting within hospitals and medical facilities, and simulation of health care systems pertaining to patients.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 6:
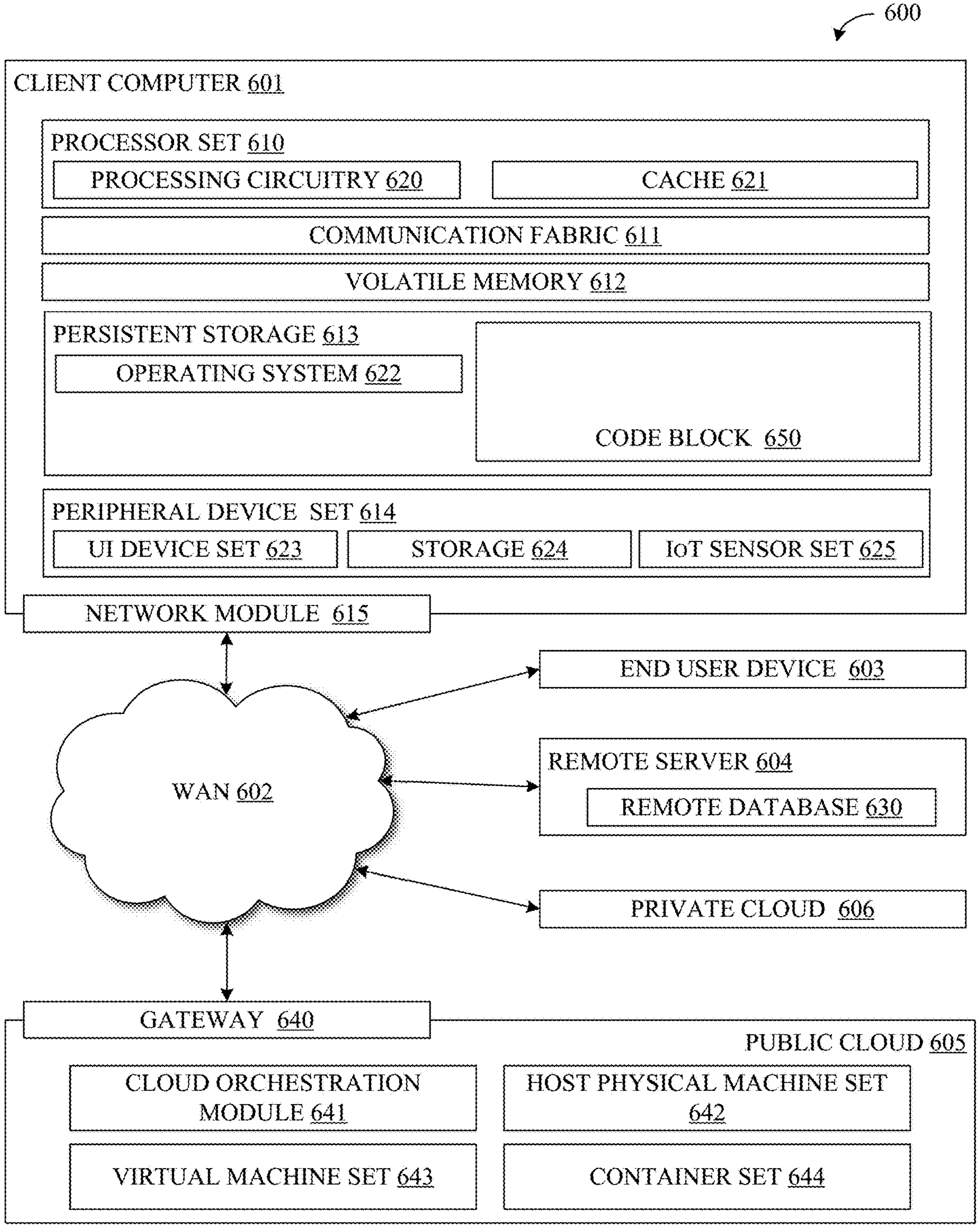
FIG. 6 is a block diagram illustrating an example of computer environment for implementing the methodology of FIGS. 4A and 4B.

Referring to FIG. 6, computing environment 600 contains an example of an environment for the execution of at least some of the computer code involved in performing the inventive methods, such as code block 650 for a queue management system. Computing environment 600 includes, for example, computer 601, wide area network (WAN) 602, end user device (EUD) 603, remote server 604, public cloud 605, and private cloud 606. In certain aspects, computer 601 includes processor set 610 (including processing circuitry 620 and cache 621), communication fabric 611, volatile memory 612, persistent storage 613 (including operating system 622 and method code block 650), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. However, to simplify this presentation of computing environment 600, detailed discussion is focused on a single computer, specifically computer 601. Computer 601 may or may not be located in a cloud, even though it is not shown in a cloud in FIG. 6 except to any extent as may be affirmatively indicated.

Processor set 610 includes one, or more, computer processors of any type now known or to be developed in the future. As defined herein, the term "processor" means at least one hardware circuit (e.g., an integrated circuit) configured to carry out instructions contained in program code.

Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In certain computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in code block 650 in persistent storage 613.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 611 is the signal conduction paths that allow the various components of computer 601 to communicate with each other. Typically, this communication fabric 611 is made of switches and electrically conductive paths, such as the switches and electrically conductive paths that make up busses, bridges, physical input/output ports and the like. Other types of signal communication paths may be used for the communication fabric 611, such as fiber optic communication paths and/or wireless communication paths.

Volatile memory 612 is any type of volatile memory now known or to be developed in the future. Examples include dynamic type random access memory (RAM) or static type RAM. Typically, the volatile memory 612 is characterized by random access, but this is not required unless affirmatively indicated. In computer 601, the volatile memory 612 is located in a single package and is internal to computer 601. In addition to alternatively, the volatile memory 612 may be distributed over multiple packages and/or located externally with respect to computer 601.

Persistent storage 613 is any form of non-volatile storage for computers that is now known or to be developed in the future. The non-volatility of the persistent storage 613 means that the stored data is maintained regardless of whether power is being supplied to computer 601 and/or directly to persistent storage 613. Persistent storage 613 may be a read only memory (ROM), but typically at least a portion of the persistent storage 613 allows writing of data, deletion of data and re-writing of data. Some familiar forms of persistent storage 613 include magnetic disks and solid state storage devices. Operating system 622 may take several forms, such as various known proprietary operating systems or open source Portable Operating System Interface type operating systems that employ a kernel. The code included in code block 650 typically includes at least some of the computer code involved in performing the inventive methods.

Peripheral device set 614 includes the set of peripheral devices for computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some aspects, storage 624 may take the form of a quantum computing storage device for storing data in the form of qubits. In aspects where computer 601 is required to have a large amount of storage (for example, where computer 601 locally stores and manages a large database) then this storage 624 may be provided by peripheral storage devices designed for storing very large amounts of data, such as a storage area network (SAN) that is shared by multiple, geographically distributed computers. Internet-of-Things (IoT) sensor set 625 is made up of sensors that can be used in IoT applications. For example, one sensor may be a thermometer and another sensor may be a motion detector.

Network module 615 is the collection of computer software, hardware, and firmware that allows computer 601 to communicate with other computers through a Wide Area Network (WAN) 602. Network module 615 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 615 are performed on the same physical hardware device. In other aspects (for example, aspects that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any Wide Area Network (for example, the internet) capable of communicating computer data over non-local distances by any technology for communicating computer data, now known or to be developed in the future. In some aspects, the WAN 602 may be replaced and/or supplemented by local area networks (LANs) designed to communicate data between devices located in a local area, such as a Wi-Fi network. The WAN 602 and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In certain aspects, EUD 603 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604. As defined herein, the term "server" means a data processing system configured to share services with one or more other data processing systems.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other aspects, a private cloud 606 may be disconnected from the internet entirely (e.g., WAN 602) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 605 and private cloud 606 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including." "comprises," and/or "comprising." when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented method using a queue management system, the computer-implemented method comprising:

identifying, in a scope of the queue management system, a user and a plurality of configurable nodes;

dynamically determining, in real-time, a proximity between the user and a particular one of the plurality of configurable nodes;

determining, using a machine learning engine and based upon the proximity and historical data associated with the scope of the queue management system, a probability measure that the user will engage with the particular one of the plurality of configurable nodes;

adding, based upon the probability measure exceeding a threshold, the user to a queue managed by the queue management system; and altering, by the queue management system and based upon the user being added to the queue, a state of the one of the plurality of configurable nodes.

2. The computer-implemented method of claim 1, wherein the proximity includes a scalar distance and a change of distance, and the scalar distance is a non-Euclidian distance.

3. The computer-implemented method of claim 1, wherein the user is associated with a personal communication device and each of the plurality of configurable nodes is respectively associated with a unique communication node, and the proximity is determined using mobile signal strength.

4. The computer-implemented method of claim 1, wherein the plurality of configurable nodes are transportation nodes.

5. The computer-implemented method of claim 1, wherein the plurality of configurable nodes includes a plurality of different types of configurable nodes.

6. The computer-implemented method of claim 1, wherein the threshold is dynamically adjusted using the machine learning engine.

7. The computer-implemented method of claim 1, wherein the determining of the probability measure includes determining a probability that the user will wait for a particular type of configurable node of the plurality of configurable nodes.

8. The computer-implemented method of claim 1, wherein the determining of the probability measure includes determining a probability that the user will travel a particular distance to the particular one of the plurality of configurable nodes.

9. A computer hardware system including a queue management system, the computer hardware system comprising:

a hardware processor configured to perform following executable operations:

identifying, in a scope of the queue management system, a user and a plurality of configurable nodes;

dynamically determining, in real-time, a proximity between the user and a particular one of the plurality of configurable nodes;

determining, using a machine learning engine and based upon the proximity and historical data associated with the scope of the queue management system, a probability measure that the user will engage with the particular one of the plurality of configurable nodes;

adding, based upon the probability measure exceeding a threshold, the user to a queue managed by the queue management system; and altering, by the queue management system and based upon the user being added to the queue, a state of the one of the plurality of configurable nodes.

10. The computer hardware system of claim 9, wherein the proximity includes a scalar distance and a change of distance, and the scalar distance is a non-Euclidian distance.

11. The computer hardware system of claim 9, wherein the user is associated with a personal communication device and each of the plurality of configurable nodes is respectively associated with a unique communication node, and the proximity is determined using mobile signal strength.

12. The computer hardware system of claim 9, wherein the plurality of configurable nodes are transportation nodes.

13. The computer hardware system of claim 9, wherein the plurality of configurable nodes includes a plurality of different types of configurable nodes.

14. The computer hardware system of claim 9, wherein the threshold is dynamically adjusted using the machine learning engine.

15. The computer hardware system of claim 9, wherein the determining of the probability measure includes determining a probability that the user will wait for a particular type of configurable node of the plurality of configurable nodes.

16. The computer hardware system of claim 9, wherein the determining of the probability measure includes determining a probability that the user will travel a particular distance to the particular one of the plurality of configurable nodes.

17. A computer program product, comprising:

a computer readable storage medium having stored therein program code, the program code, which when executed by a computer hardware system including a queue management system, causes the computer hardware system to perform:

identifying, in a scope of the queue management system, a user and a plurality of configurable nodes;

dynamically determining, in real-time, a proximity between the user and a particular one of the plurality of configurable nodes;

determining, using a machine learning engine and based upon the proximity and historical data associated with the scope of the queue management system, a probability measure that the user will engage with the particular one of the plurality of configurable nodes;

adding, based upon the probability measure exceeding a threshold, the user to a queue managed by the queue management system; and altering, by the queue management system and based upon the user being added to the queue, a state of the one of the plurality of configurable nodes.

18. The computer program product of claim 17, wherein the proximity includes a scalar distance and a change of distance, the scalar distance is a non-Euclidian distance, the user is associated with a personal communication device and each of the plurality of configurable nodes is respectively associated with a unique communication node, and the proximity is determined using mobile signal strength.

19. The computer program product of claim 17, wherein the plurality of configurable nodes are transportation nodes, and the plurality of configurable nodes includes a plurality of different types of configurable nodes.

20. The computer program product of claim 17, wherein the determining of the probability measure includes determining a probability that the user will wait for a particular type of configurable node of the plurality of configurable nodes, and the determining of the probability measure includes determining a probability that the user will travel a particular distance to the particular one of the plurality of configurable nodes.

* * * * *